(12) United States Patent
Mishra et al.

(10) Patent No.: US 12,315,501 B2
(45) Date of Patent: May 27, 2025

(54) SYSTEMS AND METHODS FOR PHONETIC-BASED NATURAL LANGUAGE UNDERSTANDING

(71) Applicant: Adeia Guides Inc., San Jose, CA (US)

(72) Inventors: Ajay Kumar Mishra, Karnataka (IN); Jeffry Copps Robert Jose, Tamil Nadu (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/423,556

(22) Filed: Jan. 26, 2024

(65) Prior Publication Data
US 2024/0249718 A1 Jul. 25, 2024

Related U.S. Application Data

(63) Continuation of application No. 17/363,651, filed on Jun. 30, 2021, now Pat. No. 11,922,931.

(51) Int. Cl.
*G06F 17/00* (2019.01)
*G06F 16/632* (2019.01)
(Continued)

(52) U.S. Cl.
CPC .......... *G10L 15/187* (2013.01); *G06F 16/632* (2019.01); *G06F 16/683* (2019.01);
(Continued)

(58) Field of Classification Search
CPC ............... G10L 15/187; G10L 15/1822; G10L 2015/025
(Continued)

(56) References Cited

U.S. PATENT DOCUMENTS 8,731,929 B2 * 5/2014 Kennewick ......... G10L 15/1822
704/270.1
10,977,452 B2 4/2021 Wang et al.
(Continued)

OTHER PUBLICATIONS

Price, "End-To-End Spoken Language Understanding Without Matched Language Speech Model Pretraining Data" ICASSP 2020 IEEE International Conf. on Acoustics, Speech and Signal Processing (ICASSP), pp. 7979-7983, doi: 10.1109/ICASSP40776.2020. 9054573 (2020).
Wang, et al., "Large-Scale Unsupervised Pre-Training for End-to-End Spoken Language Understanding," ICASSP 2020—2020 IEEE International Conf. on Acoustics, Speech and Signal Processing (ICASSP) pp. 7999-8003 (2020) doi: 10.1109/ICASSP40776.2020. 9053163.

*Primary Examiner* — Paul C McCord
(74) *Attorney, Agent, or Firm* — HALEY GUILIANO LLP

(57) ABSTRACT

Systems and methods are described for modifying a phonetic search index based on a use frequency associated with phonetic representations of text terms included in metadata of a media item. A first phonetic representation of a text term of the metadata, pronounced as a word, may be generated. A second phonetic representation of the text term may be generated by concatenating a phonetic representation of each letter in the text term. A database may be queried to determine use frequencies of the first and second phonetic representations, one of which may be selected based on a comparison of the use frequencies. A phonetic search index may be modified by including an entry for the selected phonetic representation. A voice query related to the media item may be received, and a reply to the voice query may be generated for output by performing a lookup in the modified phonetic search index.

20 Claims, 7 Drawing Sheets

(51) Int. Cl.
*G06F 16/68* (2019.01)
*G06F 16/683* (2019.01)
*G06N 5/02* (2023.01)
*G10L 15/18* (2013.01)
*G10L 15/187* (2013.01)
*G10L 15/02* (2006.01)

(52) U.S. Cl.
CPC ............ *G06F 16/686* (2019.01); *G06N 5/02* (2013.01); *G10L 15/1822* (2013.01); *G10L 2015/025* (2013.01)

(58) Field of Classification Search
USPC ........................................................ 704/254
See application file for complete search history.

(56) References Cited

U.S. PATENT DOCUMENTS

| | | |
|---|---|---|
| 11,922,931 B2 | 3/2024 | Mishra et al. |
| 2005/0015254 A1* | 1/2005 | Beaman ................ G06F 3/0482 704/E15.044 |
| 2012/0078629 A1 | 3/2012 | Ikeda et al. |
| 2016/0335266 A1* | 11/2016 | Ogle ........................ G06N 7/01 |
| 2018/0260416 A1* | 9/2018 | Elkaim .................. G06F 16/58 |
| 2020/0357390 A1* | 11/2020 | Bromand ................ G10L 13/00 |
| 2022/0284882 A1 | 9/2022 | Peddinti et al. |
| 2023/0017352 A1 | 1/2023 | Mishra et al. |

* cited by examiner

SYSTEMS AND METHODS FOR PHONETIC-BASED NATURAL LANGUAGE UNDERSTANDING

CROSS-REFERENCE TO RELATED APPLICATION

This application is a continuation of U.S. patent application Ser. No. 17/363,651, filed Jun. 30, 2021, which is hereby incorporated by reference herein in its entirety.

BACKGROUND

This disclosure is directed to modifying a phonetic search index based on a use frequency associated with phonetic representations of text terms included in metadata of a media item. Specifically, techniques are disclosed for generating for output a reply to a voice query related to the media item, where the reply may be generated by performing a lookup in the modified phonetic search index, modified based on, e.g., direct analysis of phoneme data by a natural language understanding (NLU) component of the system.

SUMMARY

Many users have become accustomed to requesting access to media content by providing voice commands (e.g., "Play the next episode of 'Game of Thrones'") to a digital assistant or other media application. In one approach, an automatic speech recognition (ASR) module receives the voice command, converts the voice command to text form, and passes the text to a natural language understanding (NLU) module, which determines what the user is requesting, in order to take a suitable action to reply to the voice command. However, in this approach, there are certain terms that the ASR module tends to struggle with transcribing from voice to text, and thus, when the ASR module passes such converted text to the NLU module, errors made by the ASR module are propagated to the NLU module, which is generally not able to correct any transcription errors made at the ASR stage. In another approach, an end-to-end spoken language module may be used to directly infer semantic meaning from audio features. However, such approach may still be deficient for adequately responding to certain queries. For example, the end-to-end spoken language module requires a suitable index of textual data, and absent such a suitable index, a voice search may fail to yield desirable results for the user. However, the ASR module or spoken language module often struggles to accurately transcribe certain terms; e.g., the module may transcribe the text "US Open" into the index as the grouping of words of "You Yes Open" rather than as including the combination of the individual letters "US," and thus a subsequent search for "US Open," would not yield any results.

To overcome these problems, systems and methods are provided herein for accessing metadata of a media item available to be played at a first time, the metadata comprising a text term; generating a first phonetic representation of the text term pronounced as a word; generating a second phonetic representation of the text term by concatenating a phonetic representation of each letter in the text term; accessing a database that comprises a plurality of phonetic representations of a plurality of queries received within a predefined period of time before the first time; querying the database to determine a first use frequency of the first phonetic representation and a second use frequency of the second phonetic representation; selecting one of the first phonetic representation and the second phonetic representation based on a comparison of the first frequency and the second frequency; modifying a phonetic search index by including in the phonetic search index an entry for the selected one of the first phonetic representation and the second phonetic representation; receiving a voice query related to the media item; and generating for output a reply to the voice query, wherein the reply is generated by performing a lookup in the modified phonetic search index.

Such aspects enable a system to leverage phoneme representations of terms and heuristics to update a phonetic search index in order to accurately identify a user query related to a media item and provide a suitable reply. For example, if a system generates multiple phoneme representations based on metadata of a media item, the system may determine that one of such phoneme representations is more likely to be relevant to future user queries based on phonemes of recent queries (e.g., Internet searches in connection with the tennis tournament "U.S. Open" as opposed to "us open" or "you yes open"). The determined phoneme representation may be used in modifying a phonetic search index such that when a voice query related to the media item is received, the system may generate a reply based on the modified index. Such modified index, rather than storing all possible phonetic representations in a particular language, which may consume a large amount of storage and require a large amount of processing power to search, may be limited to an index of key terms (e.g., based on what content is available for users to stream), thereby conserving computing resources. Moreover, the index may be improved over time based on, e.g., popular or trending searches of media items. In some embodiments, the provided systems and methods may utilize the International Phonetic Alphabet (IPA) alphabetic system of phonetic notation in generating various phonetic representations.

In some embodiments, the text term of the metadata comprises a title of the media item or a description of the media item.

In some aspects of this disclosure, the first phonetic representation, the second phonetic representation, and the plurality of phonetic representations of the plurality of queries of the database comprise a plurality of phonemes.

In some embodiments, the first phonetic representation and the second phonetic representation are generated in response to determining that the first time is within a predetermined time from a current time.

In some aspects of this disclosure, generating for output the reply to the voice query comprises: generating a phonetic representation of the voice query; determining the phonetic representation of the voice query matches the first representation and the second representation; and generating for output the reply based on the selected one of the first phonetic representation and the second phonetic representation of the modified phonetic search index.

In some embodiments, generating for output the reply to the voice query further comprises: determining a phonetic representation of a term of the voice query; identifying a plurality of sets of one or more phenomes of the phonetic representation of the term of the voice query; determining, based on the phonetic representation of the term of the voice query, a phonetic representation of a term that is a variant of the term of the voice query by: expanding a set of the one or more phonemes of the plurality of identified sets to identify one or more candidate variants; and performing the lookup in the modified index to verify a candidate variant of the one or more identified candidate variants as the phonetic representation of a term that is a variant of the term of the voice query. Such aspects enable the system to leverage the phonetic search index to identify phonetic variants of a phonetic representation of a term of the received voice query to be used in generating a reply to the voice query, which may broaden the search results provided to the user while at the same time increasing the likelihood that the results are relevant to the user, e.g., based on the phonetic variants inclusion in the phonetic search index, which in turn may be generated based on a user frequency of phonetic representations of terms. While a text system may utilize a dictionary in expanding text, such a dictionary may not be available for phonetic end-to-end systems. However, the provided systems and methods may utilize the above-described techniques to perform expansions (e.g., syllable by syllable) of phonetic representations of terms of a voice query.

In some embodiments, the variant is a phonetic or lexical variant of the term of the voice query, and the systems and methods may further provide for generating a hash value for the term of the voice query; and determining the variant of the term of the voice query by comparing the hash value to a hash value of the variant of the term of the voice query.

In some aspects of this disclosure, determining, based on the phonetic representation of the term of the voice query, the phonetic representation of a term that is the variant of the term of the voice query is performed by traversing a knowledge graph.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
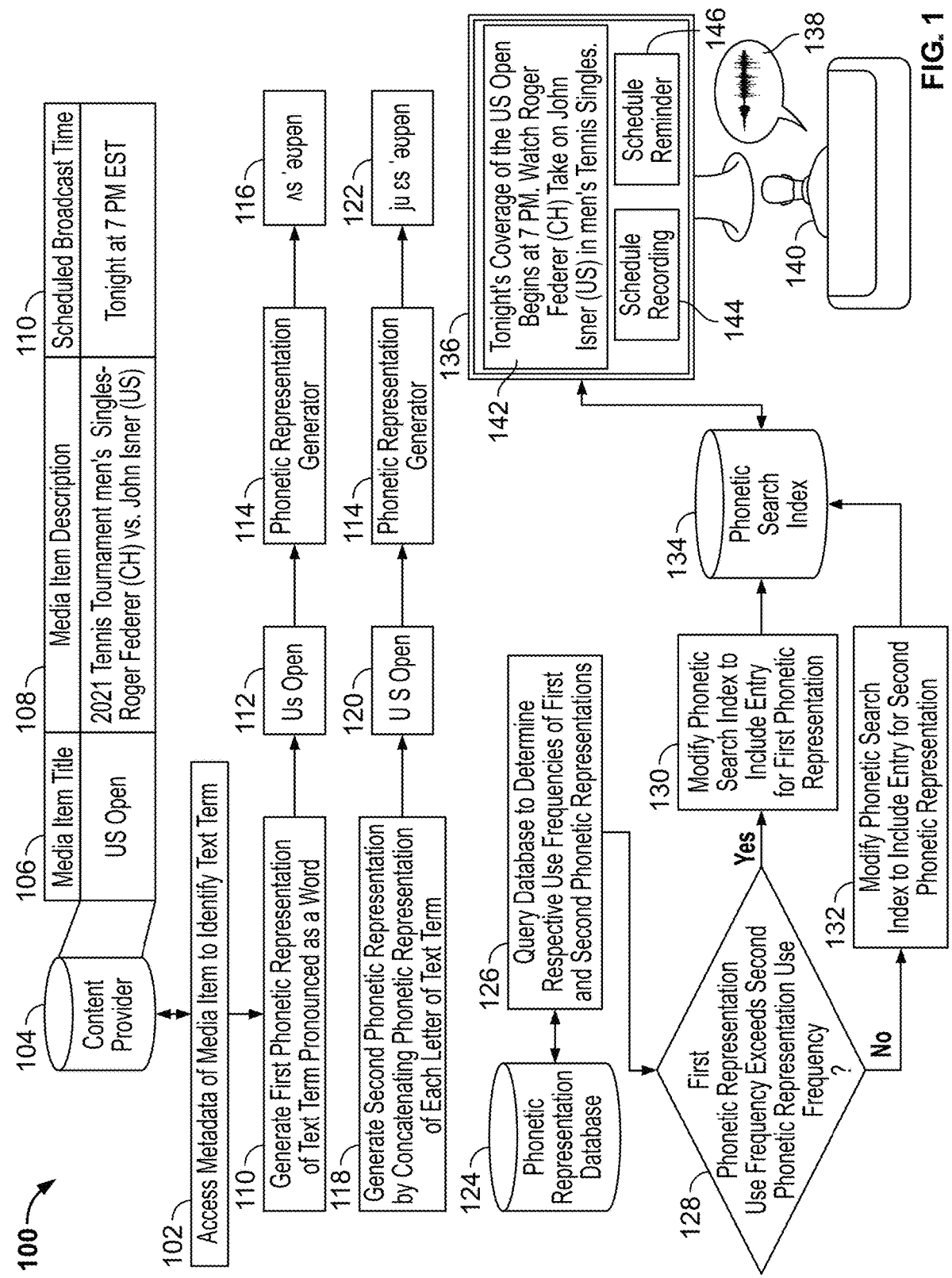
FIG. 1 shows a block diagram of an illustrative system for generating for output a reply to a voice query related to a media item, where the reply may be generated by performing a lookup in a modified phonetic search index, in accordance with some embodiments of this disclosure.

FIG. 1 shows a block diagram of an illustrative system 100 for generating for output a reply to a voice query related to a media item, where the reply may be generated by performing a lookup in a modified phonetic search index, in accordance with some embodiments of this disclosure. At 102, a media application (e.g., executed at least in part on a server, such as, for example, server 504 of FIG. 5, and/or user equipment 136 of FIG. 1) may access metadata of a media item (e.g., a current or upcoming available broadcast and/or streaming session of the US Open tennis tournament) that is available by way of content provider 104 (e.g., corresponding to media content source 502 of FIG. 5). The accessed metadata may include various attributes related to the media item, e.g., a media item title 106, media item description 108, scheduled broadcast time or indication of time when streaming of the media item is available 110. As referred to herein, the term "media item" should be understood to refer to an electronically consumable asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

The media application may access metadata stored at one or more content providers 104 at predetermined times (e.g., once every hour), a predefined time before the media item is to be made available (e.g., a hour before scheduled broadcast time 110) and/or in anticipation of a media item that is likely to interest one or more viewers (e.g., a profile of user 140 may store preferences or a viewing history that indicates user 140 is likely to be interested in the US Open tennis tournament media item). At 110, the media application may generate first phonetic representation 116 of a text term of the media item (e.g., "Us" of media item title 106 and/or terms from media item description 108) pronounced as a word 112. For example, phonetic representation generator 114, which may be implemented by the media application, may treat "Us" as a word rather than considering the letters individually (e.g., as an abbreviation for "United States") and may reference a database (e.g., phonetic representation database 124 and/or phonetic search index 134) storing phonetic representations of words. As referred to herein, phonemes may be understood as distinguishing, smallest indivisible units of sound within a particular language term that together make up terms to phrases and each phoneme may be associated with a corresponding textual grapheme representation of the sound (e.g., the grapheme "Λs" as shown in phonetic representation 116 corresponds to the phoneme of "us" spoken in audio form). The phonemes may be based on the International Phonetic Alphabet (IPA) system, which is discussed in more detail in "Handbook of the International Phonetic Association: A Guide to the Use of the International Phonetic Alphabet," Cambridge University Press, 1999, which is hereby incorporated by reference herein in its entirety. In some embodiments, to determine a phoneme of "Us open" 112, phonetic representation generator 114 may determine, by referencing phonetic representation database 124, an audio signal of a phoneme that is stored in association with the grapheme "Λs" and "us" pronounced as a word, and an audio signal of a phoneme that is stored in association with the grapheme "'əʊpən" and "open" pronounced as a word. Additionally or alternatively, a machine learning model (e.g., a transformer or neural network) may be trained to take as input a grapheme and output a phoneme (e.g., receive input of the grapheme "Λs" and output in a particular language an audio version of "us" pronounced as a word). For example, the machine learning model may be trained using labeled examples of grapheme-phoneme pairs. In some embodiments, content provider 104 may provide to the media application one or more phonetic representations of metadata of the media item, e.g., grapheme and phoneme pairs for the media item metadata. Based on one or more of such techniques, the media application may identify first phonetic representation 116.

At 118, phonetic representation generator 114 may instead analyze "us" by generating a second phonetic representation 122 of each of the letters "u" and "s" and concatenating the respective phonetic representations of such letters. For example, phonetic representation generator 114 may reference phonetic representation database 124 and/or employ the above-mentioned machine learning model to determine that the grapheme "ju" corresponds to the phoneme of the spoken audio of the letter "u," and the grapheme "es" corresponds to the phoneme of the spoken audio of the letter "s," which may result in the concatenation of "ju ɛs" for the letters of "U S" from "u s open" 120. Additionally or alternatively, the media application may look up the phonetic representation for "US," as an abbreviation rather than in word form, in a database dictionary (e.g., phonetic representation database 124). In some embodiments, second phonetic representation 122 may additionally comprise a concatenation of grapheme representations of the individual letters for the term "open," e.g., " oʊ pi i ɛn " corresponding to "o p e n." On the other hand, second phonetic representation 122 may include the grapheme representation of "open" pronounced as a word, e.g., "'oʊpən" which may also be included in first phonetic representation 116. In some embodiments, the media application may determine whether to generate a concatenation of individual letters of a term based on an arrangement of vowels and consonants in a particular metadata term. For example, if a term contains at least a predefined number of consecutive consonants (e.g., 2, such as, for example, in the overall term, or not including the first and last characters of the term) and includes less than a predefined number of characters (e.g., 4), the media application may determine that a concatenation of characters for such term should be generated. In some embodiments, phonetic representation generator 114 may be configured to identify any suitable alphanumeric character in a text term (e.g., a number, such as by converting the number to a textual representation, and identifying a corresponding grapheme and phoneme pair for the textual representation of the number).

At 126, the media application may query database 124 to determine respective use frequencies of first phonetic representation 116 and second phonetic representation 122. For example, phonetic representation database 124 may store or otherwise receive data associated with voice queries previously received by the media application and/or content provider 104 and/or other Internet search engines. In some embodiments, the media application may receive information indicative of phonetic representations of common words being spoken on various platforms, e.g., news media, social media, sports media, television networks, etc., within a predefined amount of time (e.g., 1 week or 3 days) from the present time, and such information may be stored at phonetic representation database 124. In some embodiments, the media application may determine the respective frequencies of use by analyzing raw text from a variety of sources and identifying phonetic representations of the raw text in order to determine phonemes corresponding to trending terms on the Internet (and/or trending terms from among users with a predefined geographic area corresponding to the geographic area of the user or a similar demographic of the user). The media application may compare first phonetic representation 116 and second phonetic representation 122 to phonetic representation instances populating phonetic representation database 124 in order to identify the respective use frequencies of first phonetic representation 116 and second phonetic representation 122.

At 128, the media application may determine whether the use frequency of first phonetic representation 116 exceeds the use frequency of second phonetic representation 122, each of which may be determined based on referencing phonetic representation database 124 and/or one or more other sources. In response to determining that the use frequency of first phonetic representation 116 exceeds the use frequency of second phonetic representation 122, processing may proceed to 130 where the media application may modify phonetic search index 134 to include an entry for first phonetic representation 116. Phonetic search index 134 may be understood as a searchable catalog of database records storing relationships between a plurality of phonetic representations (e.g., graphemes representing phonemes) and corresponding entities in textual form, e.g., persons, places or things, where the entities may be represented in natural language for one or more languages. For example, at 130, the media application may cause the entity "US Open" to be associated with second phonetic representation 122, e.g., ju ɛs 'oʊpən. In response to determining that the use frequency of second phonetic representation 122 exceeds the use frequency of first phonetic representation 116, processing may proceed to 132 where the media application may modify phonetic search index 134 to include an entry for second phonetic representation 122. In some embodiments, phonetic search index 134 may be populated based on converting text from a data source (e.g., content provider 104) to one or more phonetic representations (e.g., graphemes and/or phonemes) of the text. In some embodiments, the media application may take into account feedback from certain users regarding which phonetic representation is intended (e.g., explicitly by prompting the user to submit a response, or implicitly based on selections or viewing of a media item presented based on a received voice query).

Figure 4:
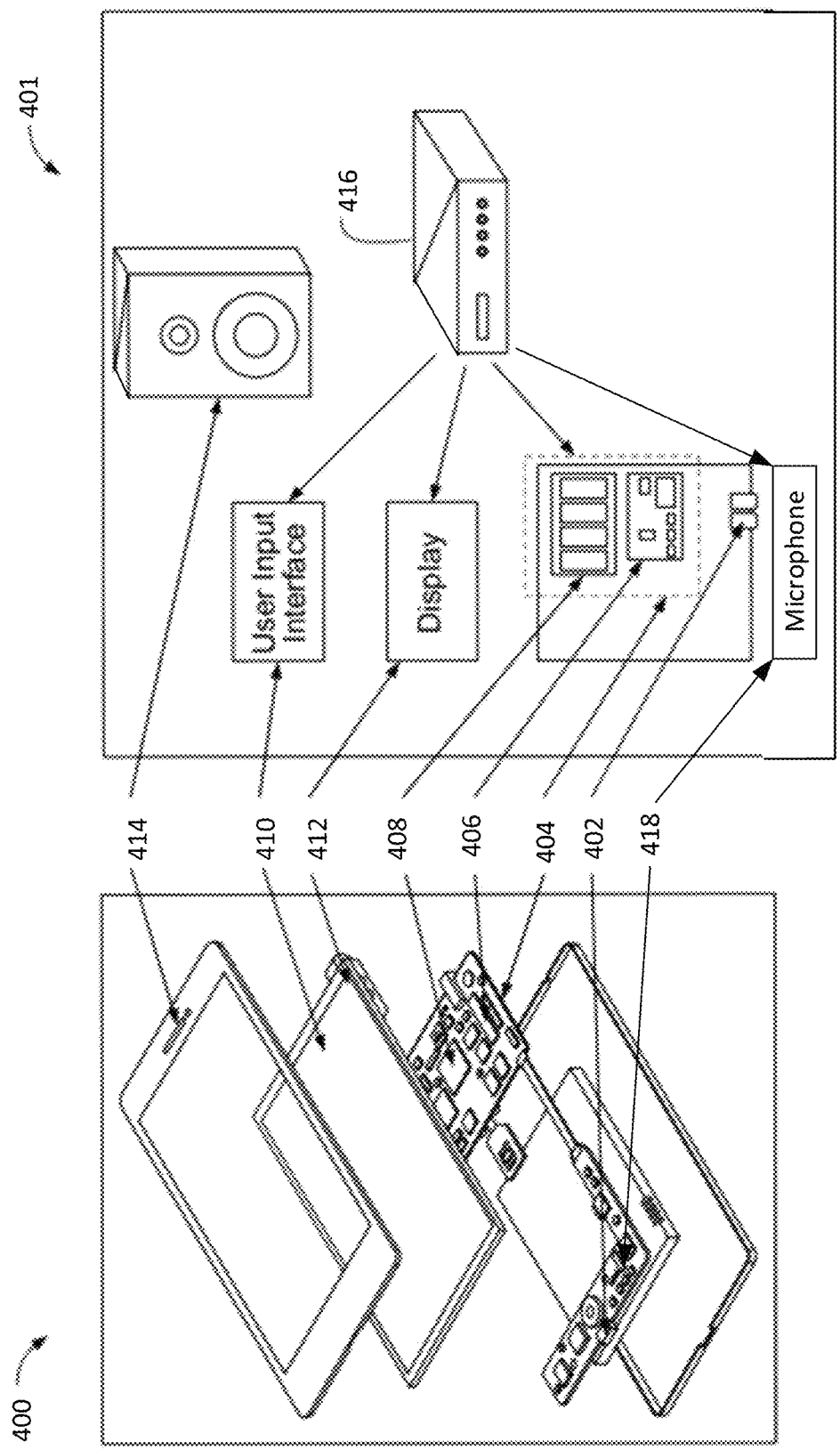
FIG. 4 shows a block diagram of an illustrative media device used in generating for output a reply to a voice query related to a media item, where the reply may be generated by performing a lookup in a modified phonetic search index, in accordance with some embodiments of this disclosure.

At 136, the media application, which may be running at least in part on user equipment 136, may receive e.g., by way of microphone 418 of FIG. 4, voice query 138 in the form of a spoken audio input of user 140. The media application may employ one or more of a variety of techniques to identify the phonemes corresponding to voice query 138. For example, a machine learning model such as, for example, acoustic model 204 of FIG. 2, e.g., recurrent neural networks, bidirectional recurrent neural networks, LSTM-RNN models, encoder-decoder models, transformers, conditional random fields (CRF) models, convolutional neural networks, etc., may be trained using labeled audio files or utterances and trained to output phoneme and/or grapheme representations of an audio input. In some embodiments, the media application may pre-process the received audio input for input into the neural network, e.g., to filter out background noise and/or normalize the signal, or such processing may be performed by the neural network. Additionally or alternatively, the media application may map voice input 202 of FIG. 2 to a corresponding phoneme representation by identifying various audio characteristics (e.g., word tone, word pitch, word emphasis, word duration, voice alteration, volume, speed, etc.) of voice query 138, and compare the identified audio characteristics to information stored at a database storing correspondences between particular audio characteristics and particular phonemes.

In some embodiments, a machine learning model may be utilized to categorize one or more intents of voice query 138. For example, the machine learning model (e.g., a neural network) may be trained to accept as input a phoneme representation of a voice query and output a likely intent and/or topic of the query (e.g., to play a sporting event, to play music, to play a movie, etc.). The machine learning model may be trained based on labeled phoneme (and/or natural language) and intent pairs, such that the machine learning model may be trained to recognize certain patterns of input data predictive of certain intents or topics. In some embodiments, such intents may be identified based on modified phonetic search index 134.

The media application may perform expansion of the phonemes and/or graphemes identified as corresponding to voice query 138, as discussed in more detail in connection with FIG. 3, to identify lexical and/or phonetic variants of identified phonemes and/or graphemes of voice query 138. For example, if audio input 138 corresponds to "Play US Open" the media application may identify the phonetic representation " oʊpən " (corresponding to the term "open") and additionally determine that the phonetic representation " oʊpənər " (corresponding to the term "opener") is related the phonetic representation " oʊpən " and thus may also be used to search phonetic search index 134 along with " oʊpən ." In some embodiments, the media application may take into account whether the identified variants are sufficiently related to one or more intents of voice query 138 which may be identified by the machine learning model as described above (e.g., if the determined intent of the query is a request for a sports game, a media item titled "MLB season opener" may be deemed sufficiently related to the query, whereas a program having metadata related to a bottle opener may be deemed not to be sufficiently related).

Based on the phonemes and/or graphemes identified for audio input 138 (and optionally one or more lexical variants of the identified phonemes and/or graphemes), the media application may perform a search of phonetic search index 134 to identify one or more entities potentially relevant to audio input 138. In some embodiments, phonetic search index 134 may comprise at least in part a knowledge graph which may be traversed to identify the one or more entities. Any suitable technique may be employed to search and retrieve relevant entities, e.g., Breadth first search, A* search, Beam search, etc. In some embodiments, in identifying relevant entities, the media application may utilize template matching techniques (e.g., templates of common queries represented phonetically). For example, the media application may employ a phoneme-to-phoneme machine learning model which may contain one or more models, one of which may be an unsupervised deep learning machine learning model used to generate vector representations (e.g., phoneme and/or grapheme embeddings) for phonemes and/or graphemes in a corpus of data used to train the model. The generated vectors may be indicative of contextual and semantic similarity between the phonetic representations in the corpus. In training the phoneme-to-phoneme machine learning model, a neural network may be employed with one or more hidden layers, where the weights of the hidden layer may correspond to the vectors being learned. The phoneme-to-phoneme machine learning model may be implemented in a similar manner to a Sord2vec model (albeit where phoneme embeddings are substituted for word embeddings). Word2vec may utilize the architectures of a Continuous Bag of Words model or a Continuous Skip-gram model to generate the word embeddings, as discussed in Mikolov et al., "Efficient Estimation of Word Representations in Vector Space," ICLR Workshop, 2013, which is hereby incorporated by reference herein in its entirety. In some embodiments, template matching may be performed based on comparing stored templates to identified phoneme embeddings, e.g., identifying a longest common subsequence and/or distance score calculations using the output of the phoneme-to-phoneme machine learning model, and the identified template may be used to determine a suitable reply 142 to voice query 138. For example, the templates may correspond to phoneme sequences of past queries, and be compared to a determined phoneme sequence of voice input 138. In some embodiments, the phoneme-to-phoneme model may be employed in identifying variants of the phonetic representation of query 138.

In the example of FIG. 1, the media application may employ heuristics in that phonetic search index 134 that may be modified by causing second phonetic representation 122 to be included in phonetic search index 134 (e.g. instead of first phonetic representation 116, or by assigning a higher weight to second phonetic representation 122 than first phonetic representation). That is, in some embodiments, first phonetic representation 116 is not included in the search phonetic search index 134 if first phonetic representation 116 is determined to have a lower use frequency than second phonetic representation 122. Based on the updated phonetic search index 134, the media application may determine that voice query 138 relates to media item title 106, and may generate for output reply 142 based on metadata stored accessed from content provider 104 and/or one or more templates identified during template matching. For example, based on the processing performed in the example of FIG. 1, media item title 106 may be determined to correspond to "U S open" where "U S" correspond to the letters being pronounced separately rather than as the pronounced as the word "us." In some embodiments, the media application may provide certain options 144, 146 in addition to reply 142, to enable selection to perform one or more actions related to the identified media item. For example, selection of option 144 may cause media item title 106 to be recorded or otherwise stored for future access by user 140, and selection of option 146 may cause the media application to provide a reminder to user 140 indicating that a current time is approaching broadcast time 110.

Figure 2:
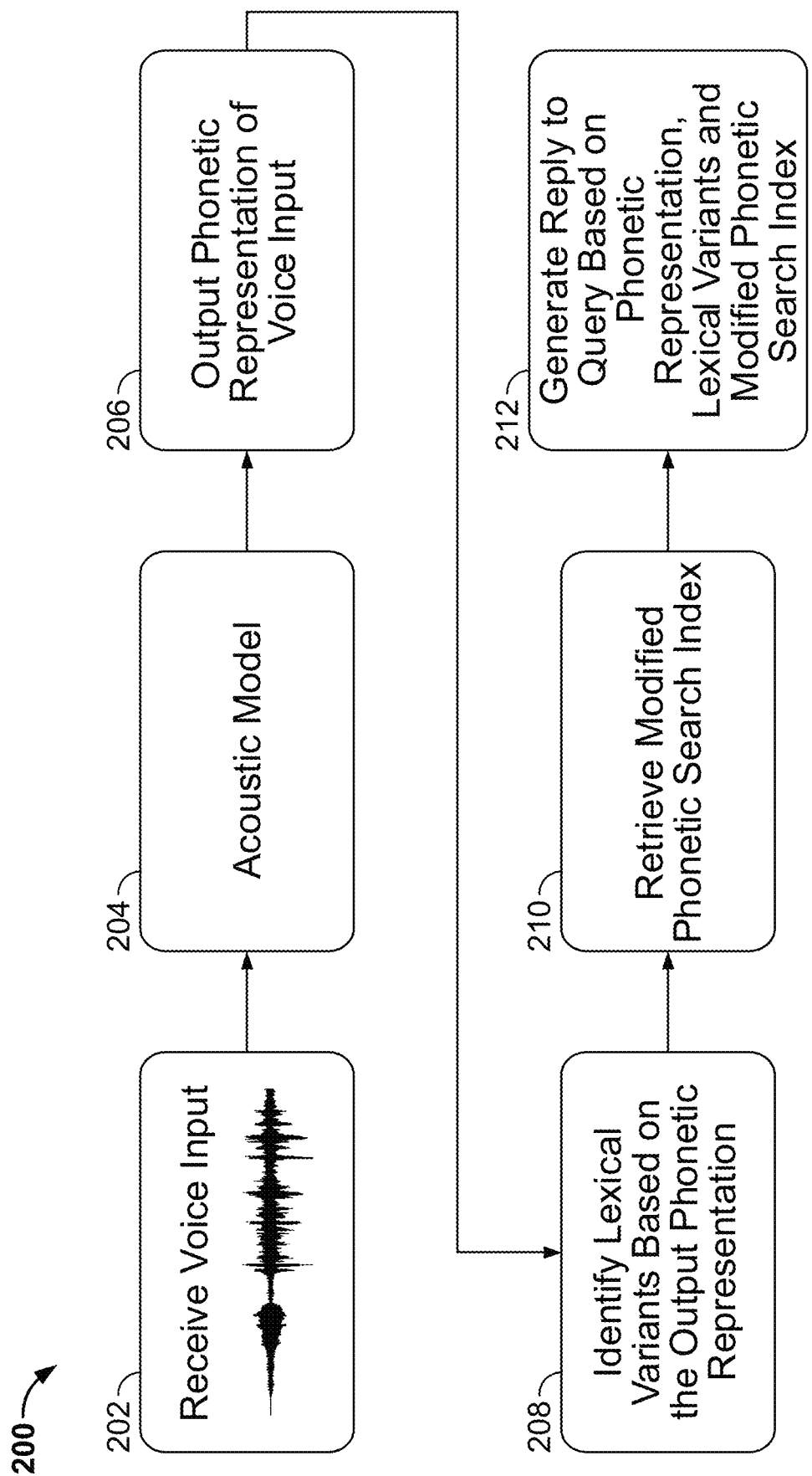
FIG. 2 shows a block diagram of an illustrative system for generating for output a reply to a voice query related to a media item, where the reply may be generated by performing a lookup in a modified phonetic search index, in accordance with some embodiments of this disclosure.

FIG. 2 shows a block diagram of an illustrative system 200 for generating for output a reply to a voice query related to a media item, where the reply may be generated by performing a lookup in a modified phonetic search index, in accordance with some embodiments of this disclosure. At 202, the media application may receive voice input 202 (e.g., corresponding to voice input 138 of FIG. 1). The media application may employ one or more of a variety of techniques to identify the phonemes corresponding to voice query 202. For example, acoustic model 204 of FIG. 2 may comprise one or more models, e.g., recurrent neural networks, bidirectional recurrent neural networks, LSTM-RNN models, encoder-decoder models, transformers, conditional random fields (CRF) models convolutional neural networks, etc., which may be trained using labeled audio files or utterances and trained to output phoneme and/or grapheme representations of an audio input. In some embodiments, the media application may pre-process the received audio input for input into the neural network, e.g., to filter out background noise and/or normalize the signal, or such processing may be performed by the neural network. Additionally or alternatively, the media application may map voice input 202 to a corresponding phoneme representation by identifying various audio characteristics (e.g., word tone, word pitch, word emphasis, word duration, voice alteration, volume, speed, etc.) of voice query 202, and comparing the identified audio characteristics to information stored at a database storing correspondences between particular audio characteristics and particular phonemes.

At 206, the media application may receive output from an acoustic model of the phonetic representation of voice input 202. For example, the media application may receive candidate phonetic representations of first phonetic representation 116 of FIG. 1 of "ʌs 'əʊpən" and second phonetic representation 122 of FIG. 1 of "ʌs 'əʊpən". In some embodiments, output 206 may be received along with confidence scores for the candidate representations. At 208, the media application may identify lexical variants based on the phonetic representation output at 206. For example, as discussed in more detail in connection with FIG. 3, the media application may identify the lexical variants of phonetic representations of "'oʊpənər," "'oʊpənz," "'oʊpənɪŋ," "'oʊpənd," "ri'oʊpən," "'oʊʃən" (respectively corresponding to "opener," "opens," "opening," "opened," "reopen," "ocean,") as shown in FIG. 3.

At 210, the media application may retrieve a modified phonetic search index, which may correspond to phonetic search index 134, which may be modified as discussed in connection with FIG. 1. For example, the media application, based on determining that a use frequency of second phonetic representation 122 exceeds a use frequency of first phonetic representation 116, may update phonetic search index 134 to include second phonetic representation 122. In some embodiments, updating phonetic search index 134 may comprise causing an association to be stored in phonetic search index 134 between the natural language phrase "US Open" and "U S open" and second phonetic representation 122 of "ju ɛs 'əʊpən." In some embodiments, any indication of a relationship between the natural language phrase "US Open" and first phonetic representation 116 of "ʌs 'əʊpən" may be removed from phonetic search index 134 if the media application determines that the use frequency of second phonetic representation 122 exceeds the use frequency of first phonetic representation 116. In some embodiments, the media application may determine that a combination of one or more terms or letters from first phonetic representation 116 may be combined with one or more terms or letters from second phonetic representation 122, and such combined phonetic representation may be used to update modified database index 134 (e.g., "ju ɛs" from second phonetic representation 122 and "'əʊpən" from first phonetic representation 116).

At 212, the media application may generate for output a reply to voice query 202 based on phonetic representation 206 output by the acoustic model at 204, lexical variants (if any) identified at 208, and modified phonetic search index 134. For example, the media application may query modified phonetic search index 134 using candidate phonetic representations (e.g., corresponding to first phonetic representation 116 of "ʌs 'əʊpən" and second phonetic representation 122 of "ʌs 'əʊpən") and determine that one of the candidate phonetic representations matches second phonetic representation 122 in modified phonetic search index 134, which corresponds to the media item "US Open" available from content provider 104. In some embodiments, the media application may perform a search of modified phonetic search index 134 of additional lexical variants (e.g., "opening") that may cause the media application to identify and include in the reply to voice query 202 other media items (e.g., "MLB opening day") which may be intended by voice query 202. In some embodiments, the media application may compare the identified query 202 to pre-generated query templates, which may be used in generating reply 212. In some embodiments, the media application may determine that a phonetic representation of a voice query corresponds to a single term as opposed to multiple terms. For example, candidate phonetic representations of a voice query may correspond to phonetic representations of "Hulu" and "Who loo," and the media application may have previously determined that a use frequency of "Hulu" exceeds "Who loo," where phonetic search index 134 may have been modified to include "Hulu." In some embodiments, modification of phonetic search index 134 may be performed in response to receiving a voice query.

Figure 3:
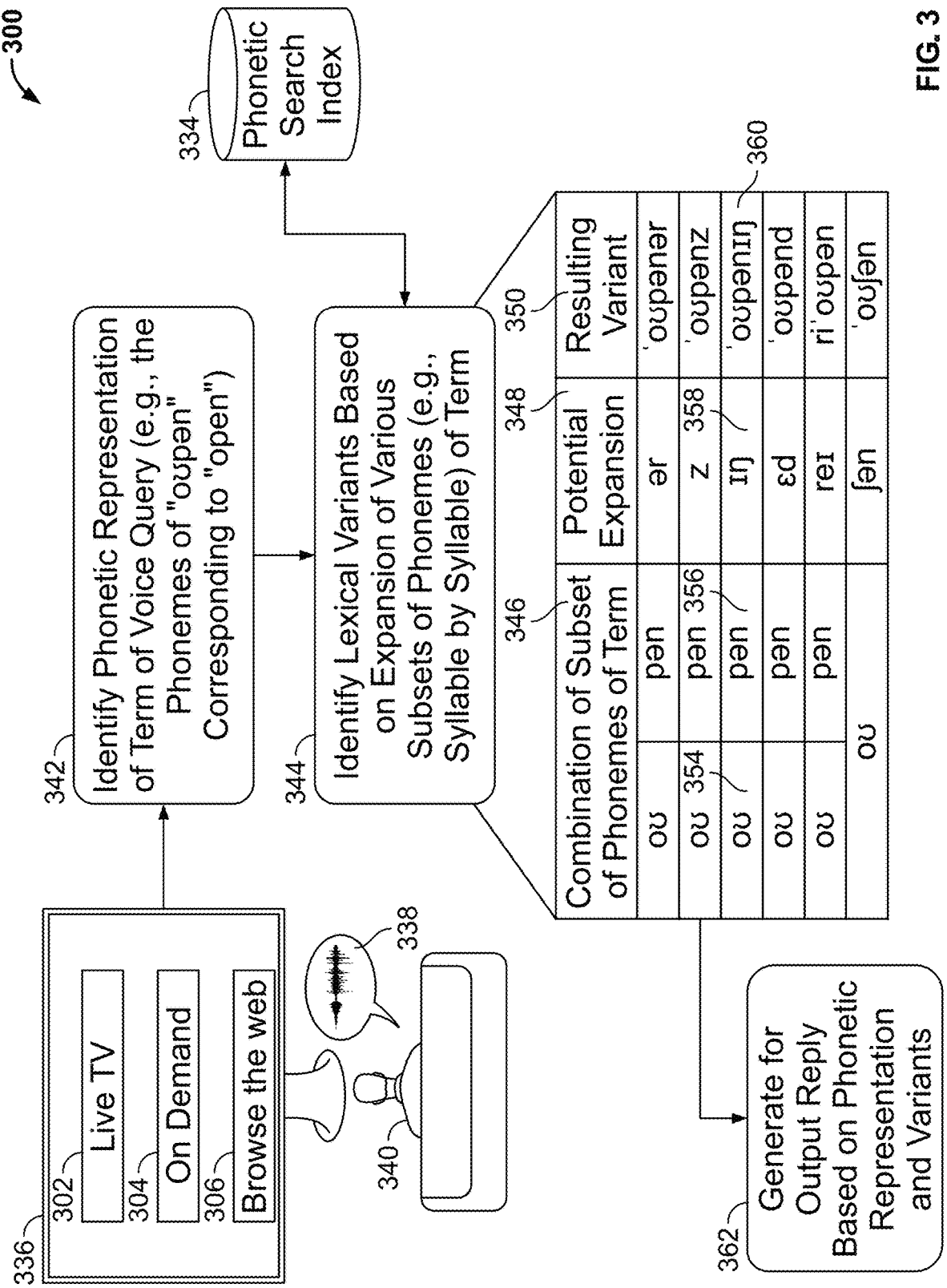
FIG. 3 shows a block diagram of an illustrative system for identifying lexical or phonetic variants of a phonetic representation of a voice query, in accordance with some embodiments of this disclosure.

FIG. 3 shows a block diagram of an illustrative system for identifying lexical or phonetic variants of a phonetic representation of a voice query, in accordance with some embodiments of this disclosure. The media application, which may be running at least in part on user equipment 336 and server 504 of FIG. 5, may cause display of one or more options, e.g., option 302 which may be selectable to access live media items being streamed or broadcasting; on-demand option 304, which may be selectable to access on-demand media items; and/or option 306 which may be selectable to access websites and webpages and other content on the Internet. The media application may receive voice input 338 of FIG. 3 from user 340. At 342, the media application may identify a phonetic representation of a term uttered in the voice query (e.g., the phonemes of "'oʊpən" corresponding to "open," where the voice query may be "Play US Open"). For example, the media application may employ the acoustic model discussed at 202 of FIG. 2 to obtain the phonetic representation of voice query 338.

At 344, the media application may identify lexical variants based on expansion of various subsets of phonemes (e.g., syllable by syllable) of a term. For example, the media application may utilize any suitable natural language processing technique (e.g., parsing the phonetic representation character by character, referencing a database storing correspondences between syllables and phonemes, etc.) to identify syllables or sub-elements of "oʊ" and "pən" of the phonetic representation "oʊpən." In some embodiments, the media application may identify various combinations 346 of sub-elements of the phonetic representation identified at 342, and reference phonetic search index 334 and/or phonetic representation database 124 of FIG. 1 (e.g., storing known phonetic representations of words) to identify potential expansions 348 which, if concatenated with the identified sub-elements, form resulting variants 350. For example, phonemes 354 and 356 may be identified as syllables or sub-elements of the phonetic representation identified at 342, and potential expansion 358 (e.g., in) may be identified based on referencing phonetic search index 334 and/or based on a list of common suffixes or prefixes stored at a database, to form resulting variant 360. Phonetic search index 334 and/or phonetic representation database 124 may be queried by the media application to determine whether resulting variant 360 corresponds to a known phonetic representation of a term (e.g., whether the term is likely to correspond to actual entities at content provider 104). In some embodiments, certain resulting variants may be discarded (e.g., not used in a subsequent search) upon determining that the resulting variant does not correspond to a known phonetic representation of a term based on a comparison to phonetic search index 334 (e.g., does not correspond to a real term or a term of a known media item). In some embodiments, the media application may determine lexical and/or phonetic variants based at least in part of traversal on a knowledge graph linking variants to a root term.

In some embodiments, potential expansion 348 may be attached to each possible combination of syllables. For example, for the input "oʊpən" divided into the combination comprising 354, 356 (e.g., "oʊ"+"pən"), potential expansion 358 may be attached to one or more syllables in each of the following combinations: "oʊ"+"ɪŋ"+"pən"; "oʊ"+"pən"+"ɪŋ"; "oʊ"+"ɪŋ"+"pən"+"ɪŋ"; "ɪŋ"+"oʊ"+"pən." The media application may search phonetic search index 334 based on each of these combinations. Since phonetic search index 334 may be configured to include only certain information (e.g., recent data), one or more of such combinations may not match any terms in phonetic search index 334. For example, the media application may determine that of each of the combinations, only "oʊ"+"pən"+"ɪŋ" corresponding to resulting variant 360 matches an entry in phonetic search index 334 and thus should be used along with "oʊ"+"pən" to perform the lookup in phonetic search index 334 in generating the reply at 362 to voice query 338. On the other hand, the media application may determine that each of the attempted combinations of "oʊ"+"ɪŋ"+"pən"; "oʊ"+"ɪŋ"+"pən"+"ɪŋ"; and "ɪŋ"+"oʊ"+"pən" does not match an entry in phonetic search index 334 and thus should not be used to perform the lookup in phonetic search index 334 in generating the reply at 362 to voice query 338.

In some embodiments, lexical and/or phonetic variants may be identified using any suitable algorithm, e.g., soundex, metaphone, Beider-Morse Phonetic Matching (BMPM), where the phonetic representation identified at 342 and/or sub-elements or syllables thereof may be used as a root term and/or in computing a hash value which may serve as an identifier of the phonetic representation. In some embodiments, the hash value may be generated by the media application (e.g., using one or more of the soundex, metaphone, BMPM algorithms) for the phonetic representation identified at 342 and candidate variants thereof. The generated hash values may be compared to each other to determine whether a candidate variant is in fact a variant of the root term, e.g., if the hash values are within a predefined similarity threshold. In some embodiments, a hash value may correspond to multiple phonetically identical or similar terms (e.g., each of "meet" and "meat" may correspond to a same hash value), and graphemes or phonemes having similar representations, e.g., similar patterns of vowels or consonants, may have similar hash values. In some embodiments, the media application may determine that there are not suitable variants for a particular phonetic representation of a voice query, and may proceed to generate a reply to voice query 338 based on the identified phonetic representation 342 without using any variants in searching phonetic search index 334. The media application may identify n-grams of prefixes or suffixes of potential variants, e.g., from a phonetic representation of a root term "generate," the phonetic representation of the sub-element "rate" may be compared to the phonetic representation of the sub-element "ration" from the phonetic representation of "generation," to determine that a phonetic similarity between such sub-elements indicates the phonetic representation of "generation" is a variant of the phonetic representation of "generate."

At 362, the media application may generate for output a reply based on the phonetic representation identified at 342 and one or more variants determined at 344. For example, the media application may search phonetic search index 134 for relevant media items having a phoneme representation matching second phonetic representation 122, e.g., "ju ɛs 'oʊpən," and variant 360 "'oʊpənɪŋ," e.g., corresponding to "opening" where the reply may comprise one or more of indication 142 of FIG. 1 related to the US open media item, and another media item related to variant 360, e.g., "MLB opening day coverage."

Figure 5:
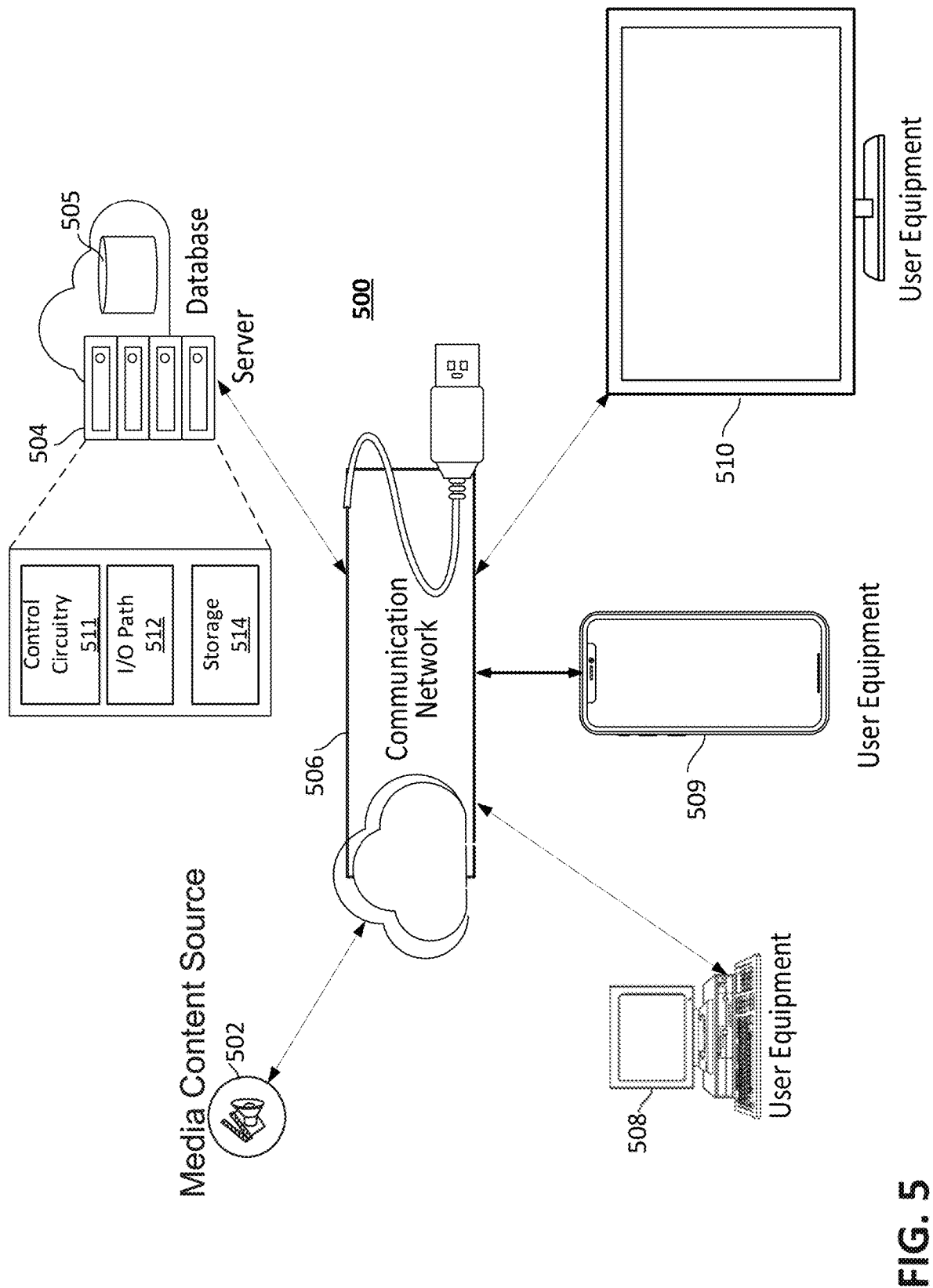
FIG. 5 shows a block diagram of an illustrative media system for generating for output a reply to a voice query related to a media item, where the reply may be generated by performing a lookup in a modified phonetic search index, in accordance with some embodiments of this disclosure.

FIGS. 4-5 describe exemplary devices, systems, servers, and related hardware for generating for output a reply to a voice query related to a media item, where the reply may be generated by performing a lookup in a modified phonetic search index, in accordance with some embodiments of the present disclosure. FIG. 4 shows generalized embodiments of illustrative user equipment devices 400 and 401, which may correspond to user equipment device 136, 336 of FIGS. 1 and 3, respectively. For example, user equipment device 400 may be a smartphone device. In another example, user equipment system 401 may be a user television equipment system. User television equipment system 401 may include set-top box 416. Set-top box 416 may be communicatively connected to microphone 418, speaker 414, and display 412. In some embodiments, microphone 418 may receive voice commands for the media application. In some embodiments, display 412 may be a television display or a computer display. In some embodiments, set-top box 416 may be communicatively connected to user input interface 410. In some embodiments, user input interface 410 may be a remote control device. Set-top box 416 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 5. Each one of user equipment device 400 and user equipment system 401 may receive content and data via input/output (I/O) path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402, which may comprise I/O circuitry. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for the media application stored in memory (e.g., storage 408). Specifically, control circuitry 404 may be instructed by the media application to perform the functions discussed above and below. In some implementations, any action performed by control circuitry 404 may be based on instructions received from the media application.

In client/server-based embodiments, control circuitry 404 may include communications circuitry suitable for communicating with a media application server or other networks or servers. The instructions for carrying out the above mentioned functionality may be stored on a server (which is described in more detail in connection with FIG. 4. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media application data described above. Nonvolatile memory may also be used (e.g., to launch a boot-up routine and other instructions). Cloud-based storage, described in relation to FIG. 4, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of user equipment 400. Control circuitry 404 may also include digital-to-analog converter circuitry and analog-to-digital converter circuitry for converting between digital and analog signals. The tuning and encoding circuitry may be used by user equipment device 400, 401 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

Control circuitry 404 may receive instruction from a user by way of user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment device 400 and user equipment system 401. For example, display 412 may be a touchscreen or touch-sensitive display. In such circumstances, user input interface 410 may be integrated with or combined with display 412. Display 412 may be one or more of a monitor, a television, a display for a mobile device, or any other type of display. A video card or graphics card may generate the output to display 412. The video card may be any processing circuitry described above in relation to control circuitry 404. The video card may be integrated with the control circuitry 404. Speakers 414 may be provided as integrated with other elements of each one of user equipment device 400 and user equipment system 401 or may be stand-alone units. The audio component of videos and other content displayed on display 412 may be played through the speakers 414. In some embodiments, the audio may be distributed to a receiver (not shown), which processes and outputs the audio via speakers 414.

The media application may be implemented using any suitable architecture. For example, it may be a stand-alone application wholly-implemented on each one of user equipment device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 508 and process the instructions to rearrange the segments as discussed. Based on the processed instructions, control circuitry 404 may determine what action to perform when input is received from user input interface 410. For example, movement of a cursor on a display up/down may be indicated by the processed instructions when user input interface 410 indicates that an up/down button was selected.

In some embodiments, the media application is a client/server-based application. Data for use by a thick or thin client implemented on each one of user equipment device 400 and user equipment system 401 is retrieved on-demand by issuing requests to a server remote to each one of user equipment device 400 and user equipment system 401. In one example of a client/server-based guidance application, control circuitry 404 runs a web browser that interprets web pages provided by a remote server. For example, the remote server may store the instructions for the application in a storage device. The remote server may process the stored instructions using circuitry (e.g., control circuitry 404) to perform the operations discussed in connection with FIGS. 1-3.

In some embodiments, the media application may be downloaded and interpreted or otherwise run by an interpreter or virtual machine (run by control circuitry 404). In some embodiments, the media application may be encoded in the ETV Binary Interchange Format (EBIF), received by the control circuitry 404 as part of a suitable feed, and interpreted by a user agent running on control circuitry 404. For example, the media application may be an EBIF application. In some embodiments, the media application may be defined by a series of JAVA-based files that are received and run by a local virtual machine or other suitable middleware executed by control circuitry 404. In some of such embodiments (e.g., those employing MPEG-2 or other digital media encoding schemes), the media application may be, for example, encoded and transmitted in an MPEG-2 object carousel with the MPEG audio and video packets of a program.

FIG. 5 is a diagram of an illustrative streaming system, in accordance with some embodiments of this disclosure. User equipment devices 508, 509, 510 (e.g., user equipment device 136 of FIG. 1, user equipment device 336 of FIG. 3) may be coupled to communication network 506. Communication network 506 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 506.

System 500 includes a media content source 502 and a server 504, which may comprise or be associated with database 505 (e.g., phonetic representation database 124 and/or phonetic search index 134 of FIG. 1). Communications with media content source 502 and server 504 may be exchanged over one or more communications paths but are shown as a single path in FIG. 5 to avoid overcomplicating the drawing. In addition, there may be more than one of each of media content source 502 and server 504, but only one of each is shown in FIG. 5 to avoid overcomplicating the drawing. If desired, media content source 502 and server 504 may be integrated as one source device.

In some embodiments, server 504 may include control circuitry 511 and a storage 514 (e.g., RAM, ROM, Hard Disk, Removable Disk, etc.). Storage 514 may store a one or more databases (e.g., phonetic representation database 124 and/or phonetic search index 134 of FIG. 1). Server 504 may also include an input/output path 512. I/O path 512 may provide device information, or other data, over a local area network (LAN) or wide area network (WAN), and/or other content and data to the control circuitry 511, which includes processing circuitry, and storage 514. The control circuitry 511 may be used to send and receive commands, requests, and other suitable data using I/O path 512, which may comprise I/O circuitry. I/O path 512 may connect control circuitry 504 (and specifically processing circuitry) to one or more communications paths.

Control circuitry 511 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 511 executes instructions for an emulation system application stored in memory (e.g., the storage 514). Memory may be an electronic storage device provided as storage 514 that is part of control circuitry 511.

Server 504 may retrieve guidance data from media content source 502, process the data as will be described in detail below, and forward the data to user equipment devices 508, 509, 510. Media content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). Media content source 502 may include cable sources, satellite providers, on-demand providers, Internet providers, over-the-top content providers, or other providers of content. Media content source 502 may also include a remote media server used to store different types of content (including video content selected by a user), in a location remote from any of the client devices. Media content source 502 may also provide metadata that can be used to in analyzing a received query and generating a reply as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network such as the Internet via communication network 506. In such embodiments, user equipment devices may operate in a peer-to-peer manner without communicating with a central server.

Figure 6:
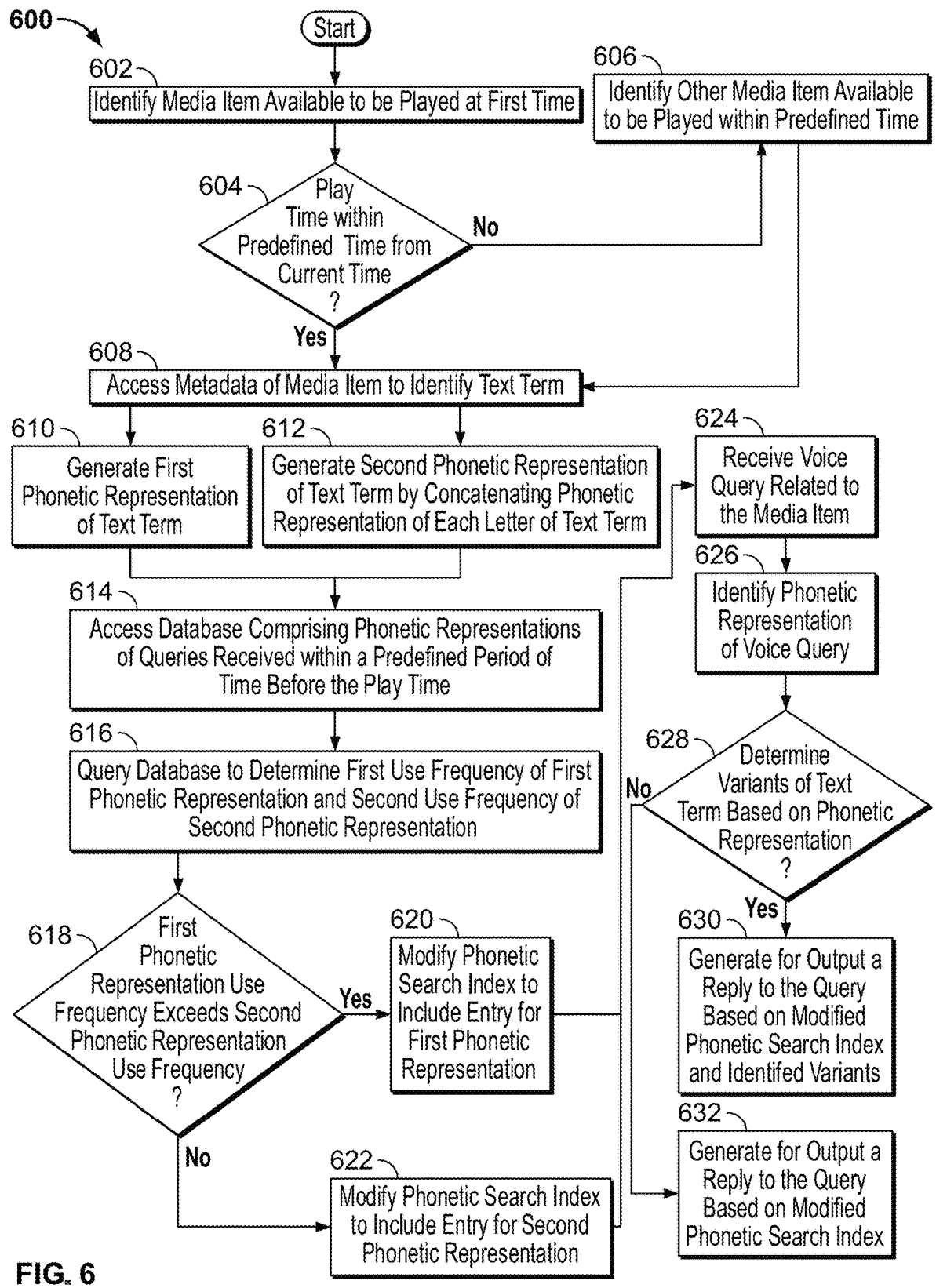
FIG. 6 is a flowchart of a detailed illustrative process for generating for output a reply to a voice query related to a media item, where the reply may be generated by performing a lookup in a modified phonetic search index, in accordance with some embodiments of this disclosure.

FIG. 6 is a flowchart of a detailed illustrative process for generating for output a reply to a voice query related to a media item, where the reply may be generated by performing a lookup in a modified phonetic search index, in accordance with some embodiments of this disclosure. In various embodiments, the individual steps of process 600 may be implemented by one or more components of the devices and systems of FIGS. 1-5. Although the present disclosure may describe certain steps of process 600 (and of other processes described herein) as being implemented by certain components of the devices and systems of FIGS. 1-5, this is for purposes of illustration only, and it should be understood that other components of the devices and systems of FIGS. 1-5 may implement those steps instead. For example, the steps of process 600 may be executed at device 509 and/or server 504 of FIG. 5 to perform the steps of process 600.

At 602, control circuitry (e.g., control circuitry 404 of FIG. 4 and/or control circuitry 511 of FIG. 5) may be configured to identify a media item (e.g., the US Open tennis tournament) available to be played at first time (e.g., 7 PM EST of a current day), based on referencing one or more data sources (e.g., content provider 104). In some embodiments, the control circuitry may, at 604, determine whether the media item scheduled playtime or availability time is within a predefined time from a current time (e.g., 24 hours) prior to accessing metadata (e.g., media item title 106, media item description 108, scheduled broadcast time 110) associated with the media item at 608. If the control circuitry determines at 604 that the play time is not within the predefined period of time, the control circuitry may identify at 606 an other media item(s) available to be played within the predefined period of time, and access the metadata of the media item at 608. In some embodiments, the control circuitry may take into account user preferences or viewing history prior to identifying the media item.

At 610, control circuitry (e.g., control circuitry 404 of FIG. 4 and/or control circuitry 511 of FIG. 5) may be configured to generate a first phonetic representation (e.g., first phonetic representation 116 of "ʌs ˈəʊpən") of a text term (e.g., "US") of the media item metadata (e.g., from the media item title 106 "US Open") when pronounced as a word. At 612, the control circuitry may be configured to generate a second phonetic representation (e.g., second phonetic representation 122 of "ju ɛs ˈəʊpən") by concatenating phonetic representations of individual letters of the text term (e.g., "U" and "S") of the media item metadata (e.g., from the media item title 106 "US Open"). In some embodiments, the first phonetic representation and the second phonetic representation may be obtained based on, e.g., output of a machine learning model, information received from content provider 104, referencing a database, such as, for example, phonetic representation database 124 and/or phonetic search index 134 of FIG. 1.

At 614, control circuitry (e.g., control circuitry 404 of FIG. 4 and/or control circuitry 511 of FIG. 5) may be configured to access a database (e.g., phonetic representation database 124 of FIG. 1) comprising phonetic representations of queries received within a predefined period of time before the play time. For example, the control circuitry may access information indicative of phonetic representations of recent voice or text queries received by user equipment 508, 509, 510 and/or server 504 of FIG. 5, phonetic representations of recent audio clips of Internet or television content, etc.

At 616, control circuitry (e.g., control circuitry 404 of FIG. 4 and/or control circuitry 511 of FIG. 5) may be configured to query the database (e.g., phonetic representation database 124 of FIG. 1) to determine the first use frequency of first phonetic representation and second use frequency of the second phonetic representation. For example, at 618, the control circuitry may determine that the first phonetic representation 116 was received in a query significantly fewer times than second phonetic representation 122 (e.g., in the week leading up to the US Open tennis tournament), and processing may proceed to 622; otherwise processing may proceed to 620. At 620, the control circuitry may modify the phonetic search index (e.g., phonetic search index 134 of FIG. 1) to include an entry for the first phonetic representation having the higher user frequency.

On the other hand, at 622, the control circuitry may modify the phonetic search index (e.g., phonetic search index 134 of FIG. 1) to include an entry for the second phonetic representation having the higher user frequency, in response to determining the first phonetic representation use frequency does not exceed the second phonetic representation use frequency. In some embodiments, the phonetic representation having the lower use frequency may be removed from the phonetic search index.

At 624, the control circuitry (e.g., control circuitry 404 of FIG. 4 and/or control circuitry 511 of FIG. 5) may receive a voice query (e.g., voice query 138) related to the media item (e.g., the US Open tennis tournament). At 626, the control circuitry may identify a phonetic representation of the voice query, e.g., based on output of a machine learning model trained to accept audio input, and output a phonetic representation of the audio input, by performing a lookup in phonetic search index 134 and/or phonetic representation database 124 of phonemes and/or graphemes similar to those of the voice query, etc. In some embodiments, the control circuitry may determine whether the identified phonetic representation of the voice query matches the first and/or second phonetic representation of 610, 612.

Figure 7:
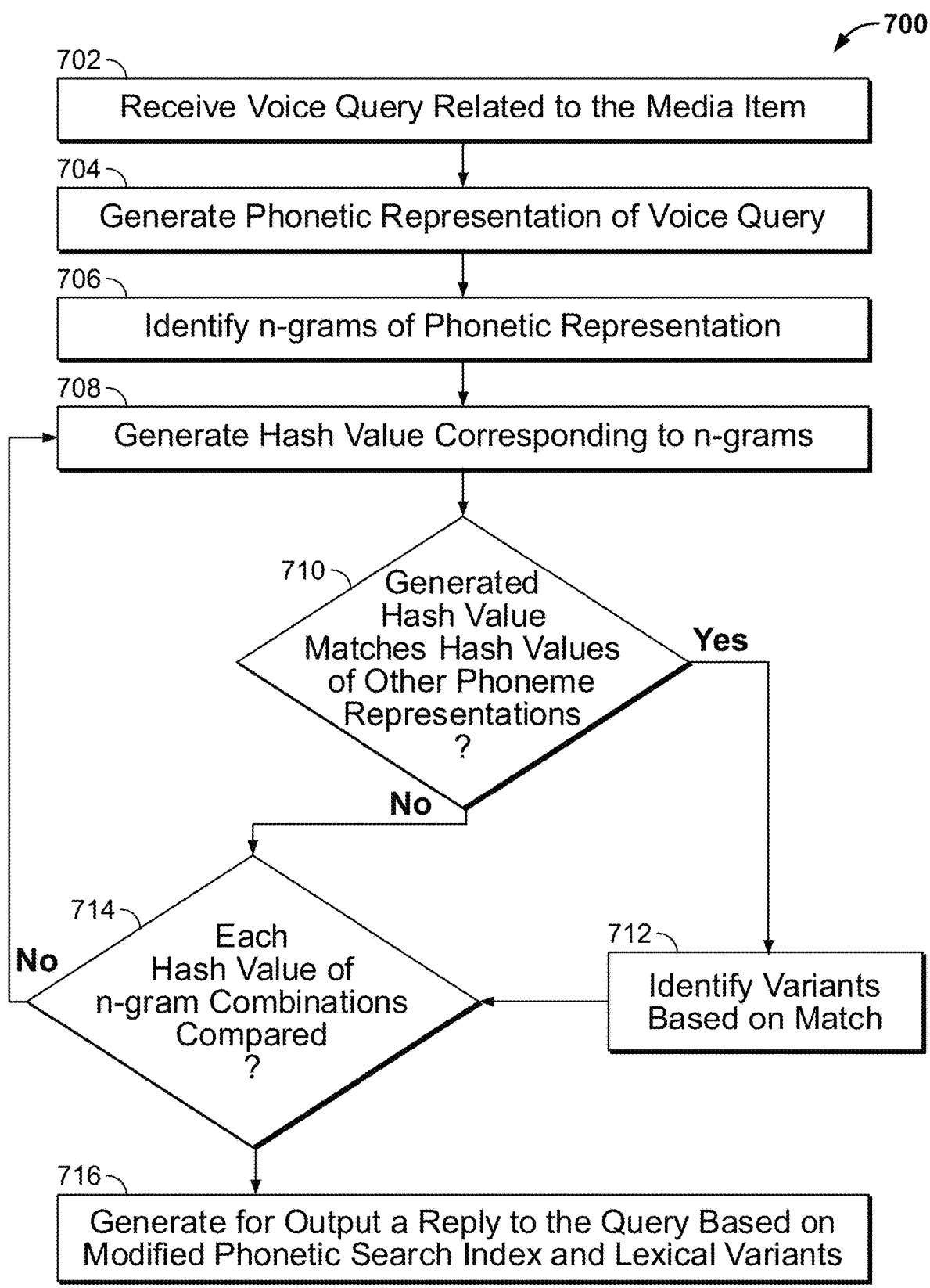
FIG. 7 is a flowchart of a detailed illustrative process for identifying lexical variants of a phonetic representation of a voice query, in accordance with some embodiments of this disclosure.

At 628, the control circuitry (e.g., control circuitry 404 of FIG. 4 and/or control circuitry 511 of FIG. 5) may determine whether there are phonetic or lexical variants of the phonetic representation identified at 626, as discussed in further detail in FIG. 7. For example, the control circuitry may identify phonetic representation 360 of "ˈoʊpənɪŋ" as a variant of the identified phonetic representation, e.g., "ʌs ˈəʊpən" and/or "ju ɛs ˈəʊpən" corresponding to first and second phonetic representations 116, 122, respectively.

In some embodiments, as discussed in connection with FIG. 3, a potential expansion 348 may be attached to each possible combination of syllables. For example, for the input "oʊpən" divided into the combination comprising 354, 356 (e.g., "oʊ"+"pən"), potential expansion 358 may be attached to one or more syllables in each of the following combinations: "oʊ"+"ɪŋ"+"pən"; "oʊ"+"pən"+"ɪŋ"; "oʊ"+"ɪŋ"+"pən"+"ɪŋ"; "ɪŋ"+"oʊ"+"pən."

The media application may search phonetic search index 334 based on each of these combinations. Since phonetic search index 334 may be configured to include only certain information (e.g., recent data), one or more of such combinations may not match any terms in phonetic search index 334. For example, the media application may determine that of each of the combinations, only "oʊ"+"pən"+"ɪŋ" corresponding to resulting variant 360 matches an entry in phonetic search index 334 and thus should be used along with "oʊ"+"pən" to perform the lookup in phonetic search index 334 in generating the reply at 362 to voice query 338. On the other hand, the media application may determine that each of the attempted combinations of "oʊ"+"ɪŋ"+"pən"; "oʊ"+"ɪŋ"+"pən"+"ɪŋ"; and "ɪŋ"+"oʊ"+"pən" does not match an entry in phonetic search index 334 and thus should not be used to perform the lookup in phonetic search index 334 in generating the reply at 362 to voice query 338.

At 630, in response to determining one or more variants of the phonetic representation identified at 628, the control circuitry (e.g., control circuitry 404 of FIG. 4 and/or control circuitry 511 of FIG. 5) may generate for output a reply to the query based on the modified phonetic search index and identified variants. For example, based on the phonetic representation identified at 628, reply 142 of FIG. 1 may be generated for output providing information regarding the US Open tennis tournament based on a lookup in modified phonetic search index 134, and based on the identified variant, a currently available or soon-to-be-available media item of "MLB Opening day" may be identified based on a lookup in phonetic search index 134.

At 632, in response to determining there are no variants of the phonetic representation identified at 628, the control circuitry (e.g., control circuitry 404 of FIG. 4 and/or control circuitry 511 of FIG. 5) may generate for output a reply to the query based on modified phonetic search index 134. For example, based on the phonetic representation identified at 628, reply 142 of FIG. 1 may be generated for output providing information regarding the US Open tennis tournament based on a lookup in modified phonetic search index 134, modified based on determining that the second phonetic representation use frequency exceeds the use frequency of the first phonetic representation. In some embodiments, modified phonetic search index 134 may store the first phonetic representation in association with metadata of the media item and/or templates for reply 142 in natural language form. In some embodiments, the modified phonetic search index may be utilized by the control circuitry in response to determining that the phonetic representation identified at 626 matches one or more of the first phonetic representation 610 and the second phonetic representation 612.

FIG. 7 is a flowchart of a detailed illustrative process for identifying lexical variants of a phonetic representation of a voice query, in accordance with some embodiments of this disclosure. In various embodiments, the individual steps of process 700 may be implemented by one or more components of the devices and systems of FIGS. 1-5. Although the present disclosure may describe certain steps of process 700 (and of other processes described herein) as being implemented by certain components of the devices and systems of FIGS. 1-5, this is for purposes of illustration only, and it should be understood that other components of the devices and systems of FIGS. 1-5 may implement those steps instead. For example, the steps of process 700 may be executed at device 509 and/or server 504 of FIG. 5 to perform the steps of process 700.

At 702, the control circuitry (e.g., control circuitry 404 of FIG. 4 and/or control circuitry 511 of FIG. 5) may receive a voice query (e.g., voice query 338 of FIG. 3), and, at 704, may generate a phonetic representation of the voice query in a similar manner as at 630 of FIG. 6.

At 706, the control circuitry (e.g., control circuitry 404 of FIG. 4 and/or control circuitry 511 of FIG. 5) may identify n-grams of the phonetic representation identified at 704, e.g., "ʌs 'əʊpən" and/or "ju ɛs 'əʊpən" corresponding to first and second phonetic representations 116, 122, respectively. For example, the control circuitry may identify various combinations of syllables and/or sub-elements of the phonetic representations, such as, for example, n-grams of "oʊ" 354 and "pən" 356.

At 708, the control circuitry (e.g., control circuitry 404 of FIG. 4 and/or control circuitry 511 of FIG. 5) may generate a hash value corresponding to each identified n-gram, e.g., syllable or sub-element of the phonetic representation identified at 704. For example, the hash value may be generated based on a pattern of consonants and/or vowels in the particular syllable or sub-element.

At 710, the control circuitry (e.g., control circuitry 404 of FIG. 4 and/or control circuitry 511 of FIG. 5) may determine whether the generated hash value matches (e.g., based on a comparison to compute a similarity score) has values of other phoneme representations generated based on appending prefixes or suffixes to one or more of 354, 356 of FIG. 3 or based on being sufficiently similar to the phonetic representation identified at 704. For example, potential expansion 348 of "ɪŋ" 358 may be appended to the sub-elements of n-grams of "oʊ" 354 and "pən" 356 to identify resulting variant 350 of "'oʊpənɪŋ" 360 (e.g., corresponding to the natural language text term "opening"). The control circuitry may perform a lookup in phonetic search index 134 and/or phonetic representation database 124 to check for the presence of a phonetic representation corresponding to resulting variant 360, e.g., to ensure that candidate resulting variant 350 corresponds to a real term and/or a term of a media item available for viewing. In some embodiments, the phonetic representation of a term that is the variant of the term of the voice query is performed by traversing a knowledge graph (e.g., organized by phonemes and/or graphemes).

At 712, the control circuitry (e.g., control circuitry 404 of FIG. 4 and/or control circuitry 511 of FIG. 5) may identify variants (e.g., variant 360) based on a determination, at 710, that a hash value for such variant matches the hash value of the phonetic representation identified at 704. At 714, the control circuitry may determine whether each hash value of n-gram combinations of the phonetic representation identified at 704 has been attempted. If not, processing may return to 708 to determine additional candidate variants and associated hash values. In response to determining that each variant has been attempted, processing may proceed to 716.

At 716, the control circuitry (e.g., control circuitry 404 of FIG. 4 and/or control circuitry 511 of FIG. 5) may generate for output a reply to the query based on a modified phonetic search index and identified variants. For example, based on the phonetic representation identified at 626, reply 142 of FIG. 1 may be generated for output providing information regarding the US Open tennis tournament based on a lookup in modified phonetic search index 134, and based on the identified variant, a currently available or soon-to-be-available media item of "MLB Opening day" may be identified based on a lookup in phonetic search index 134. On the other hand, if the control circuitry does not identify any variants, reply 142 of FIG. 1 may be generated for output solely providing information regarding the US Open tennis tournament based on a lookup in modified phonetic search index 134.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

In addition, the systems and methods described herein may be performed in real time. It should also be noted that the systems and/or methods described above may be applied to, or used in accordance with, other systems and/or methods.

What is claimed is:

1. A method comprising:
   maintaining, by a media delivery service, a database of media items available for delivery, via a network, to a plurality of devices subscribed to the media delivery service;
   determining that a media item will become available for delivery at a first time;
   accessing metadata of the media item, the metadata comprising a text term;
   generating a first phonetic representation of the text term pronounced as a word;
   generating a second phonetic representation of the text term by concatenating a phonetic representation of each letter in the text term;
   tracking a plurality of voice queries, received by the media delivery service, from the plurality of devices subscribed to the media delivery service, wherein the tracking is performed over a predefined period of time prior to the first time when the media item will become available for delivery to determine:
      a first number of a first subset of the plurality of voice queries that matched the first phonetic representation over the predefined period of time; and
      a second number of a second subset of the plurality of voice queries that matched the second phonetic representation over the predefined period of time;
   after the predefined period of time, based at least in part on comparing the first number to the second number, selecting one of the first phonetic representation or the second phonetic representation;
   modifying the database of media items to associate the media item with the selected phonetic representation; and
   outputting an identifier of the media item based on a subsequent voice query of a device of the plurality of devices matching the selected phonetic representation.

2. The method of claim 1, wherein the accessing the metadata of the media item is performed based in part on determining that a profile of a user indicates that the user is interested in the media item, and wherein the profile of the user comprises a plurality of user preferences and a viewing history of the user.

3. The method of claim 1, wherein the metadata of the media item comprises at least one of: a title of the media item, a description of the media item, a scheduled broadcast time of the media item, an indication of access to the media item and an indication of what time the media item will be available to be streamed.

4. The method of claim 1, wherein the plurality of voice queries received from the plurality of devices subscribed to the media delivery service comprises a plurality of phonetic representations of the plurality of voice queries, and wherein the plurality of phonetic representations of the plurality of voice queries comprises a plurality of phonemes.

5. The method of claim 1, wherein the first phonetic representation and the second phonetic representation comprise a plurality of phonemes.

6. The method of claim 1, further comprising:
   training a machine learning model using labeled audio files or utterances; and
   training the machine learning model to output phoneme or grapheme representations of a voice input, wherein the phoneme or the grapheme representations of the voice input are compared with the phonetic representation of the text term.

7. The method of claim 6, wherein the machine learning model is trained to accept as input the phoneme or the grapheme representation of the voice input and output a likely intent or topic of the voice input.

8. The method of claim 1, further comprising:
   generating a hash value for the text term of a voice query of the plurality of voice queries; and
   determining a variant of the text term of the voice query of the plurality of voice queries by comparing the hash value to a hash value of the variant of the text term of the voice query of the plurality of voice queries.

9. The method of claim 1, wherein the modifying the database of media items comprises modifying a phonetic search index to include in the phonetic search index an entry for the selected phonetic representation.

10. The method of claim 1, further comprising:
    determining that a scheduled playtime or an availability time of the media item is not within the predefined period of time from a current time; and
    based in part on the determining that the scheduled playtime or the availability time of the media item is not within the predefined period of time:
       identifying alternative media items available to be played within the predefined period of time; and
       accessing metadata associated with the alternative media items.

11. A system comprising:
    a memory configured to maintain a database of media items available for delivery from a media delivery service, via a network, to a plurality of devices subscribed to the media delivery service;
    an input/output (I/O) circuitry; and
    a control circuitry configured to:
       determine that a media item will become available for delivery at a first time;
       access metadata of the media item, the metadata comprising a text term;
       generate a first phonetic representation of the text term pronounced as a word;
       generate a second phonetic representation of the text term by concatenating a phonetic representation of each letter in the text term;
       track a plurality of voice queries, received by the media delivery service, from the plurality of devices subscribed to the media delivery service, wherein the tracking is performed over a predefined period of time prior to the first time when the media item will become available for delivery to determine:
          a first number of a first subset of the plurality of voice queries that matched the first phonetic representation over the predefined period of time; and
          a second number of a second subset of the plurality of voice queries that matched the second phonetic representation over the predefined period of time;
       after the predefined period of time, based at least in part on comparing the first number to the second number, select one of the first phonetic representation or the second phonetic representation, wherein the selected phonetic representation is stored in the memory;
       modify the database of media items stored in the memory to associate the media item with the selected phonetic representation; and wherein the I/O circuitry is configured to:
output an identifier of the media item based on a subsequent voice query of a device of the plurality of devices matching the selected phonetic representation.

12. The system of claim 11, wherein the control circuitry is configured to access the metadata of the media item based in part on determining that a profile of a user indicates that the user is interested in the media item, and wherein the profile of the user comprises a plurality of user preferences and a viewing history of the user.

13. The system of claim 11, wherein the metadata of the media item comprises at least one of: a title of the media item, a description of the media item, a scheduled broadcast time of the media item, an indication of access to the media item and an indication of what time the media item will be available to be streamed.

14. The system of claim 11, wherein the plurality of voice queries received from the plurality of devices subscribed to the media delivery service comprises a plurality of phonetic representations of the plurality of voice queries, and wherein the plurality of phonetic representations of the plurality of voice queries comprises a plurality of phonemes.

15. The system of claim 11, wherein the first phonetic representation and the second phonetic representation comprise a plurality of phonemes.

16. The system of claim 11, wherein the control circuitry is further configured to:
train a machine learning model using labeled audio files or utterances; and
train the machine learning model to output phoneme or grapheme representations of a voice input, wherein the phoneme or the grapheme representations of the voice input are compared with the phonetic representation of the text term.

17. The system of claim 16, wherein the machine learning model is trained to accept as input the phoneme or the grapheme representation of the voice input and output a likely intent or topic of the voice input.

18. The system of claim 11, wherein the control circuitry is further configured to:
generate a hash value for the text term of a voice query of the plurality of voice queries; and
determine a variant of the text term of the voice query of the plurality of voice queries by comparing the hash value to a hash value of the variant of the text term of the voice query of the plurality of voice queries.

19. The system of claim 11, wherein the control circuitry is configured to modify the database of media items by modifying a phonetic search index to include in the phonetic search index an entry for the selected phonetic representation.

20. The system of claim 11, wherein the control circuitry is further configured to:
determine that a scheduled playtime or an availability time of the media item is not within the predefined period of time from a current time; and
based in part on the determining that the scheduled playtime or the availability time of the media item is not within the predefined period of time:
identify alternative media items available to be played within the predefined period of time; and
access metadata associated with the alternative media items.

* * * * *